United States Patent [19]

Huang

[11] Patent Number: 4,546,791
[45] Date of Patent: Oct. 15, 1985

[54] SAFETY VALVE

[76] Inventor: E-Jen Huang, No. 449, Ching Chuo Rd., Chi Feng Village, Wu Feng Hsiang, Taichung Hsien, Taiwan

[21] Appl. No.: 591,239

[22] Filed: Mar. 20, 1984

[51] Int. Cl.$^4$ ............................................. F16K 17/06
[52] U.S. Cl. ................................... 137/512; 137/116; 417/28
[58] Field of Search .................. 137/512, 116; 417/28

[56] References Cited

U.S. PATENT DOCUMENTS

| 1,798,631 | 3/1931 | Rodler | 137/116 X |
| 2,356,306 | 8/1944 | Davis | 417/28 |
| 2,487,575 | 11/1949 | Mercier | 137/116 |
| 2,752,754 | 7/1956 | Jaseph | 417/28 X |
| 3,446,238 | 5/1969 | Norstrud | 417/28 X |

Primary Examiner—Robert G. Nilson
Attorney, Agent, or Firm—Lowe, King, Price & Becker

[57] ABSTRACT

An improved safety valve for a feeding water machine, comprising a first casing having an inlet and an outlet, a spring-loaded sliding member slidably mounted into the first casing, a spring-loaded steel ball mounted into the spring-loaded sliding member, a ring mounted into the sliding member to confine the spring-loaded steel ball, a supporting member abutting against the ring, a second casing fixedly attached to the first casing, a stem threadedly engaged with the second casing in such a manner that it may be screwed into or out of the second casing, a push member fastened to the end of the stem, a spring located against the push member at one end and provided with a spring shoe at the other end, a sliding rod disposed against the spring shoe and contacting a second steel ball at the other end, and a spacer mounted between the first casing and the second casing.

1 Claim, 4 Drawing Figures

4,546,791

SAFETY VALVE

BACKGROUND OF THE INVENTION

A safety valve is a mechanical device which may release pressure in a steam boiler, etc., when it becomes too great. Accordingly, many kinds of safety valves have been developed, but none of them can lead to entirely satisfactory results.

With reference to FIGS. 1 and 2, there are shown a prior art safety valve and a feeding water machine with the prior art safety valve, respectively. As illustrated, the safety valve (6) comprises an inlet (60) at the left side with respect to FIG. 2 and an outlet (61) communicated with the inlet (60). At the end of the inlet (60) there is a spring-loaded ball valve (63) which, upon receiving pressure greater than a predetermined value, will be opened. Consequently, the safety valve (6) will release pressure when it becomes too great. However, the safety valve (6) has the following drawbacks:

1. When the end of the pipe (not shown) connected with the outlet (61) is closed, the pressure inside the safety valve (6) as a consequence will be abruptly increased and so the safety valve will be opened to let water flow out of the outlet (66) so as to release the water pressure therein. Nevertheless, the compressor (50) of the feeding water machine (5) will continue to run even if the end of the pipe connected with the outlet (61) is closed, thereby wasting much energy.

2. To stop the feeding water machine for any significant period of time, it is necessary to first close the end of the pipe (not shown) connected with the outlet (61) of the safety valve (6) and then to switch off the feeding water machine (5). Furthermore, it is necessary to manually open the piping (not shown) connected with the outlet (61) so as to release the pressure therein; otherwise, the high pressure upstream of the valve will maintain pressure inside the feeding water machine and may expedite the aging of the packings (not shown) mounted in the feeding water machine (5).

SUMMARY

It is a primary object of the present invention to provide an improved safety valve which may obviate the above-mentioned drawbacks of the prior art safety valve.

It is another object of the present invention to provide an improved safety valve which will cooperate with a microswitch to control the line power to a feeding water machine.

It is still another object of the present invention to provide an improved safety valve which will be automatically opened to release the liquid therein at a predetermined pressure.

It is still another object of the present invention to provide an improved safety valve which will cut off the line power to the feeding water machine when the piping connecting with the feeding water machine is blocked.

It is still another object of the present invention to provide an improved safety valve which increases the operational safety of a feeding water machine.

It is still another object of the present invention to provide an improved safety valve which may prolong the life of a feeding water machine.

It is a further object of the present invention to provide an improved safety valve which is energy-saving.

For the above reasons, the inventor of the present invention has decided to create an improved safety valve which may obviate the above-mentioned drawbacks.

Other objects and merits and a fuller understanding of the present invention will be obtained by those having ordinary skill in the art when the following detailed description of the best mode contemplated for practicing the invention is read in conjunction with the accompanying drawings, wherein like numerals refer to like or similar parts.

DETAILED DESCRIPTION OF THE PREFERRED EMBODIMENT

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
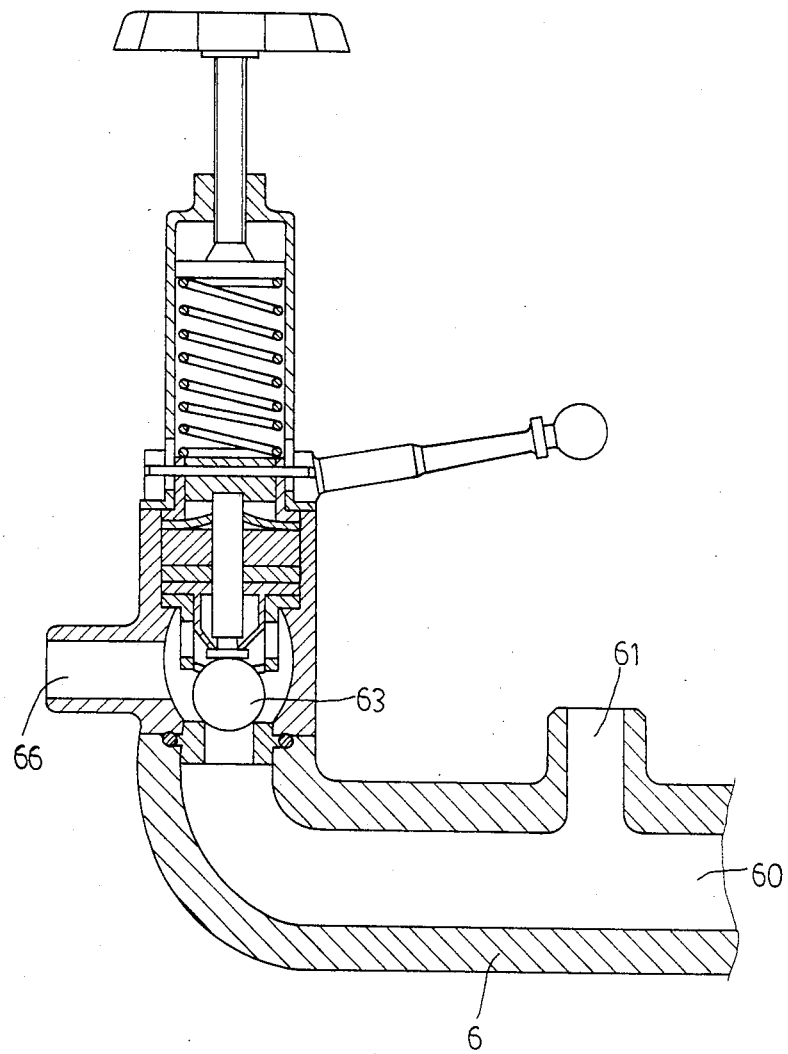
FIG. 1 a sectional view of a prior art safety valve.
Figure 2:
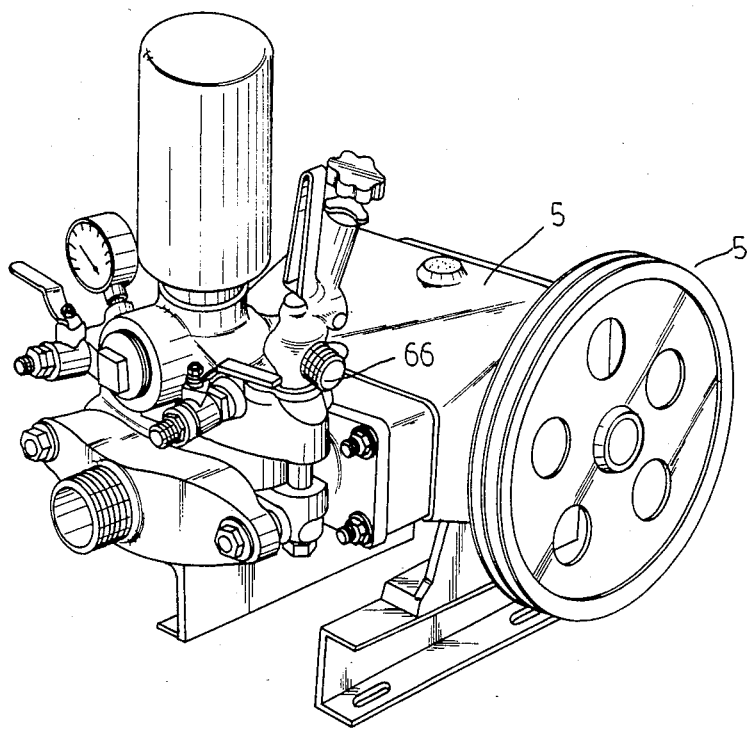
FIG. 2 shows an application of the prior art safety valve to a feeding water machine.
Figure 3:
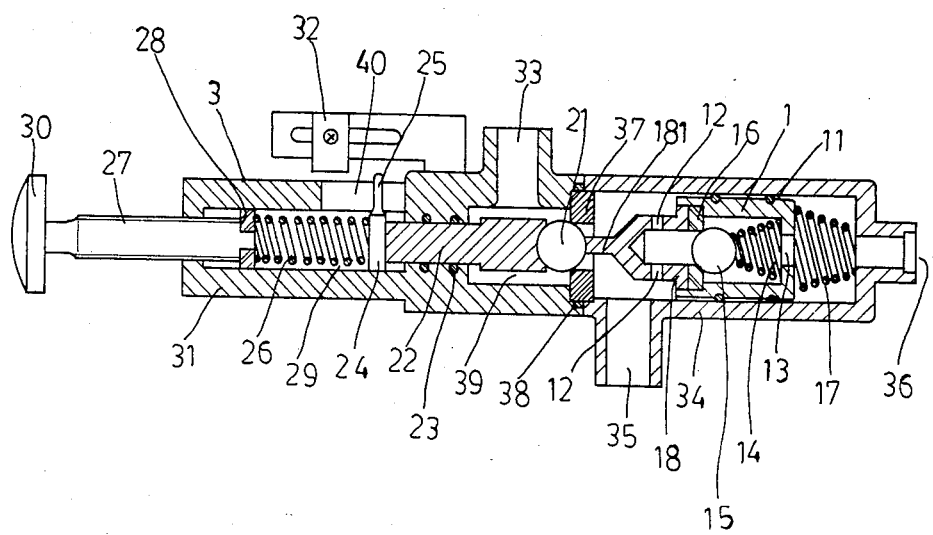
FIG. 3 is a sectional view of an improved safety valve according to a preferred embodiment of the present invention.

Referring now to the drawings, and in particular to FIG. 3, there is shown an improved safety valve according to a preferred embodiment of the present invention. As can be seen, the improved safety valve (3) comprises a first casing (34) and a second casing (31) which are fixedly joined together by suitable means such as riveting or the like. The first casing (34) is provided with an outlet (36) at the right and an inlet (35) at the bottom with reference to FIG. 3. Within the first casing (34) there is a spring-loaded sliding member (1) having a hole (13) facing and coaxial with the outlet (36). Two leak-proof packings (11) are provided on the outer surface of the sliding member (1). In the interior of the sliding member (1) is mounted a spring-loaded steel ball (15). A ring (16) preferably made of copper is positioned at the left of the ball (15) so as to confine the ball (15) into the sliding member (1). Further, a supporting member (18) having two holes (12) abuts against the ring (16).

The second casing (31) is located at the left of the first casing (34) with reference to FIG. 3. The second casing (31) comprises two chambers (29) and (39). A stem (27) is threadedly engaged with the second casing (31) in the way such that one end of the stem (27) extends into the chamber (29) while the other end of the stem (27) protrudes out of the second casing (31). At the free end of the stem (27) is mounted a knob (30) by means of which the stem (27) may be screwed in or out of the second casing (31). A push member (28) is fastened to the other end of the stem (27). At the right of the push member (28) is a spring (26) which is located between the push member (28) and a spring shoe (24). The spring shoe (24) is provided with a protuberance (25) extending through a slot (40) at the top of the second casing (31). A sliding rod (22) is positioned at the chamber (39) and extends at one end into the chamber (29) to be in contact with the spring shoe (24). Two leak-proof packings (23) are on the sliding rod (22) so as to prevent water from entering into the chamber (29). A steel ball (21) is located at the right end of the sliding rod (22). An outlet (33) is provided at the top of the second casing (31) and communicates with the chamber (39). Between the first casing (34) and the second casing (31) is a spacer ring (37) and a leak-proof packing (38). The supporting member (18) has a elongated portion (181) which goes through the spacer ring (37) to contact the steel ball (21). Furthermore, a microswitch (32) connected with the power source of the feeding water machine (8) is mounted on the second casing (29).

Figure 4:
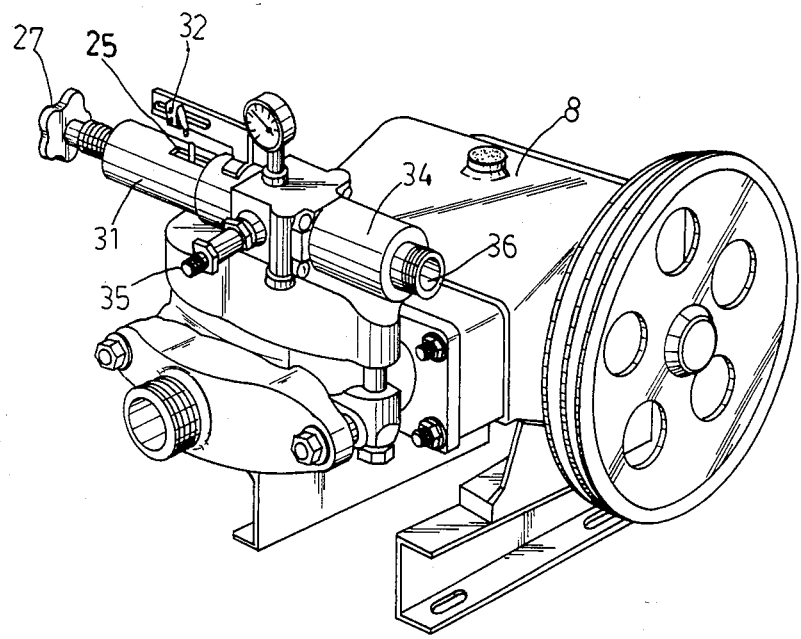
FIG. 4 shows an application of the improved safety valve to a feeding water machine.

Turning now to FIG. 4, there is shown an application of the improved safety valve to a feeding water machine. The improved safety valve is connected with the hydraulic compressor (not shown) of the feeding water machine (8) at the inlet (35). The outlet (36) is connected with a pipe (not shown) equipped with a sprayer (not shown).

In use, water first flows into the improved safety valve from the inlet (35), and then passes through the holes (12) into supporting member (18), where it pushes the steel ball (15), against the biasing force of compression spring 14, away from the ring (16). Then the water flows through the hole (13) of the sliding member (1) and out of the outlet (36) of the improved safety valve. Spring 17, located between the outlet end of first casing 34 and the outside end of sliding support member 18 inside it, is larger than spring 14 whose biasing force against ball 15 is overcome by the incoming water pressure. This ensures that support member 18 remains compressively and slidably biased such that its elongated portion 181 maintains a force having the effect of retaining ball 21 in the concavely shaped end of sliding rod 22 supported inside second casing 31. Therefore, since the compression constant of the spring (26) is greater than the compression constants of the springs (14) and (17), the steel ball (21) will remain stationary under normal water pressure. When the water pressure reaches a predetermined value, higher than the pressures that exist during normal flow, the steel ball (21) will be pushed away from the ring (37) against the biasing force of compressive spring 26 pushing on it via sliding rod 22, thereby enabling the water therein to flow out of the outlet (33) and, therefore, releasing the pressure. Persons skilled in the art will recognize that the operator of the valve can adjust the compressive force applied by spring 26 on sliding rod 22, by threadedly screwing in stem 27 with respect to the end of second casing 31 by means of knob 30, thus presetting the pressure at which the valve of this invention provides relief.

As the steel ball (21) is moved away from the ring (37) due to an increase in pressure in first casing 34, it will urge the sliding rod (22) to go into the chamber (29) of the second casing (31). Accordingly, the spring shoe (24) is moved towards the stem (27), with its protuberance (25) switching off the microswitch (32) to cut off the line power to the feeding water machine (8).

Since spring 26 is compressively stressed, by selective threading in of threaded stem 27 pressing via push member 28 on one end thereof, it normally maintains a sufficient sealing force on ball 21. When a build-up of pressure requires movement of ball 21 away from spacer ring 37, spring 17 slidably maintains elongated portion 181 in contact with ball 21 to keep it in place in the concavely shaped end of sliding rod 22.

Typically, when the pipe (not shown) connected to the outlet (36) is blocked, a high pressure will exist in the improved safety valve, causing movement of the ball (21) providing relief of pressure and switching off the microswitch (32).

Although this invention has been described with a certain degree of particularity, it is understood the present disclosure has been made by way of example only and that numerous changes in the detail of construction and the combination and arrangement of parts may be resorted to without departing from the spirit and scope of the invention as hereinafter claimed.

I claim:

1. An improved safety valve for feeding water machine, comprising:
    a first casing having an inlet and outlet;
    a spring-loaded sliding member slidably mounted into said first casing, said spring-loaded sliding member having a hole communicating with said outlet;
    a spring-loaded steel ball mounted into said spring-loaded sliding member;
    a ring mounted into said sliding member so as to confine said spring-loaded steel ball into said sliding member;
    a supporting member abutting against said ring, said supporting member having an elongated portion and two holes communicating with said inlet;
    a second casing fixedly attached to said first casing, said second casing having a first chamber, a second chamber and an outlet communicating with said second chamber;
    a stem threadedly engaged with said second casing in such a way that said stem may be screwed into or out of the first chamber of said second casing;
    a push member mounted into said second casing and fastened to the end of said stem;
    a spring located against said push member at one end and provided with a spring shoe at the other end, said spring shoe having a protuberance extending out of said second casing;
    a sliding rod disposed against said spring shoe and contacting a second steel ball at the other end; and
    a spacer mounted between said first casing and said second casing, said spacer having a center hole through which the elongated portion of said supporting member extends to contact said second steel ball.

* * * * *